H. A. BELL.
MACHINE FOR MAKING LEATHER OF UNIFORM THICKNESS.
APPLICATION FILED NOV. 26, 1915.
1,216,053.
Patented Feb. 13, 1917.
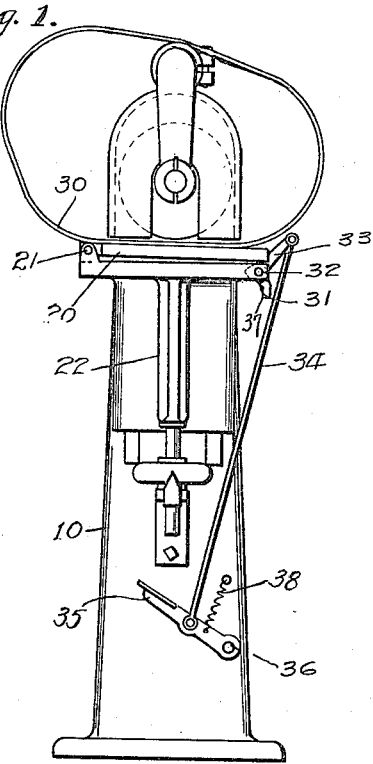
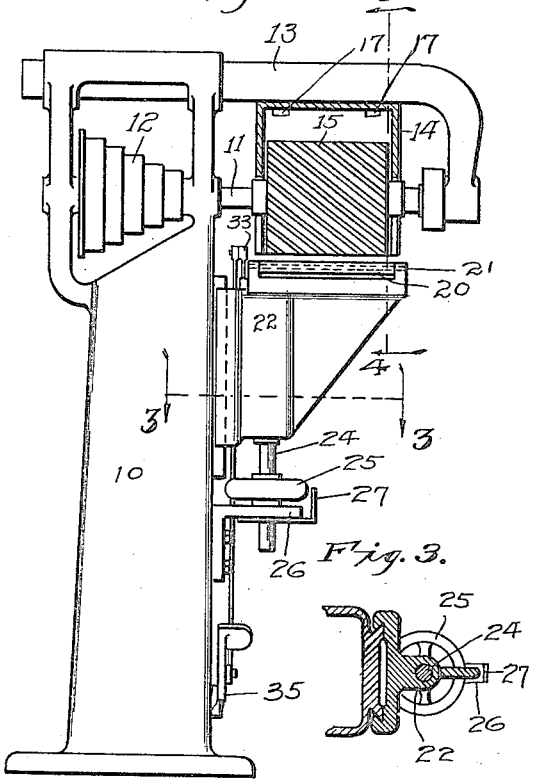
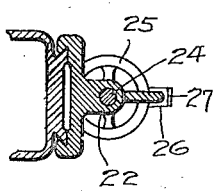
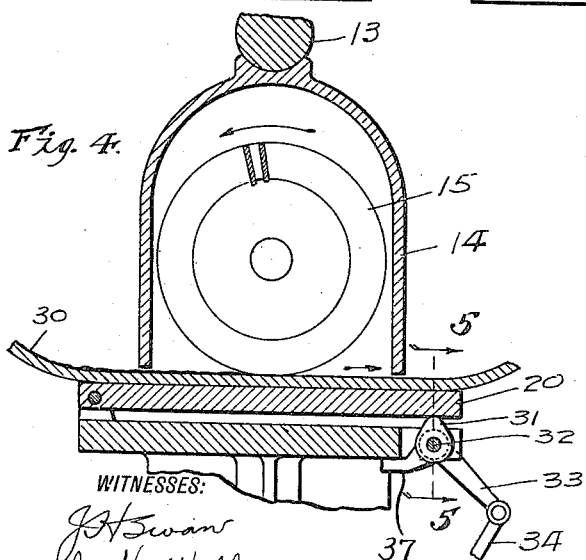
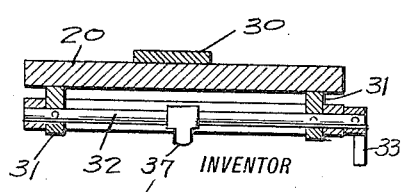
INVENTOR
Harry A Bell
BY
Lockwood & Lockwood
ATTORNEYS

UNITED STATES PATENT OFFICE.

HARRY A. BELL, OF INDIANAPOLIS, INDIANA, ASSIGNOR TO HIDE, LEATHER & BELTING COMPANY, OF INDIANAPOLIS, INDIANA, A CORPORATION.

MACHINE FOR MAKING LEATHER OF UNIFORM THICKNESS.

1,216,053.   Specification of Letters Patent.   Patented Feb. 13, 1917.

Application filed November 26, 1915. Serial No. 63,581.

*To all whom it may concern:*

Be it known that I, HARRY A. BELL, a citizen of the United States, and a resident of Indianapolis, county of Marion, and State of Indiana, have invented a certain new and useful Machine for Making Leather of Uniform Thickness; and I do hereby declare that the following is a full, clear, and exact description thereof, reference being had to the accompanying drawings, in which like letters refer to like parts.

The object of this invention is to trim leather to uniform thickness by means of a rotary scraper, cutter or the like. Devices have been employed for this purpose which are cutters operating on a different principle from the rotary scraper and not having many of the advantages of the rotary scraper for performing this important work in connection with the leather.

One feature of the invention consists in combining with the rotary scraper mounted in a relatively fixed position, a table coöperating therewith for supporting the leather and holding it to the scraper, and means for moving said table away from the scraper to admit the introduction and removal of the leather to a position between the table and scraper and moving the table the right distance toward the scraper and holding it there during the operation of the machine on the leather for determining the exact thickness of the leather desired.

Along with the foregoing is a gage for accurately determining the position of the table when elevated, in relation to the scraper.

The full nature of the invention will be understood from the accompanying drawings and the following description and claims.

In the drawings, Figure 1 is an elevation of the right-hand side of the machine showing a strip of leather placed in the machine for treatment. Fig. 2 is a front elevation of the machine with the leather to be treated omitted. Fig. 3 is a section on the line 3—3 of Fig. 2. Fig. 4 is a section on the line 4—4 of Fig. 2. Fig. 5 is a section on the line 5—5 of Fig. 4.

The machine herein shown is provided with a stand 10 having a transverse shaft 11 mounted in the upper part thereof driven by a belt, not shown, operating on a pulley 12. The outer end of the shaft 11 has bearing in a downwardly turned end or arm of a round member 13 secured in the upper end of the stand and extending horizontally over and supporting a hood 14 which covers a scraper or cutter 15 secured on the shaft. The scraper 15 has on its periphery a series of spirally disposed cutters or scrapers.

There is a table 20 located below the scraper and pivoted along one edge by a rod 21 to the top of a table support 22. The table support is mounted in connection with the stand 10 so as to be vertically adjustable, as shown in Figs. 2 and 3, and it is adjusted by a screw 24 which extends down therefrom through a hand wheel 25 to a bracket 26 secured to the stand 10. The adjusting wheel 25 has a graduated scale on its periphery which coöperates with an indicator 27 secured to the bracket 26 for indicating the distance between the rotary scraper and the table 20, or in other words, to indicate the thickness of the leather after it passes through the machine. By turning the adjusting wheel 25, the table 20 can be elevated or lowered to a minute degree and the exact thickness of the leather may thus be predetermined.

The table 20 is oscillatable on its pivot so that it can be moved downward and increase the space between it and the rotary scraper to enable the strip of leather 30 to be put in place under the scraper. Then the table 20 is elevated to its proper distance from the scraper and the scraper operated for trimming the flesh side of the leather and cause the leather to have uniform thickness.

The free end of the table 20 is elevated by cams 31 on a shaft 32 mounted in the top of the table support 22. The shaft 32 is oscillated by an arm 33 pivoted to a connecting rod 34 which extends downward and is pivoted between the ends of a pedal lever 35 which is pivoted at 36 to the stand 10. The actuating movement of the cams is limited by any suitable means, that shown herein being a stop arm 37 secured on the shaft 32 and adapted to engage the upper end of the stand 10 and limit the movement of the cams 31 when they are at their upward limit of movement. These cams should be preferably of such length as to support the free end of the table horizontally, although that is not absolutely necessary. The table is returned by a spring 38 connecting the pedal lever and the stand on which it is pivoted.

The operation of the machine is as follows:

It is in its idle position in Fig. 1 with the table 20 down away from the scraper. That permits the easy insertion of the band or strip 30 under the scraper and upon the table. Then the pedal is depressed which will lift the table to its upper position and then the rotary scraper is started and it cuts, scrapes and trims the flesh side of the leather, the movement of the leather being retarded, however, by hand during the scraping operation. In other words, the leather is held so that it will not feed through the machine as fast as the rotary scraper operates. This will enable the scraper to smooth the upper surface of the leather and leave it with a thickness exactly equal to the distance between the scraper and the table upon which the leather is placed. When an endless strip of leather is being trimmed, as herein shown, the leather strip rides over the circular rod or member 13. When the strip of leather has been trimmed or scraped throughout its entire length, the pedal is released, whereupon the parts are returned to their idle position which enables the easy removal of the leather. The wheel 25 is operated to adjust the table 20 so that the desired thickness of the leather may be obtained.

The hood 14 is made of heavy plate, say one half inch thick, so as to be very firm and its lower front and rear edges perform a very important function in guiding the leather strip at both sides of the scraper to keep the leather strip nearly flat against the table below. This causes the proper presentation of the leather to the scraper and prevents the surface of the leather being presented to the scraper except at the point of tangency, and so if the strip would be jerked by the scraper out of the workman's hands, the hood performs the function of protecting the workman from the scraper or cutter.

The invention claimed is:

1. A machine for making leather of a uniform thickness including a rotary scraper, a table for holding the leather in position to be treated by the scraper, a table support adjustable toward and away from the rotary scraper, means for elevating and lowering said table, and means for predetermining the position of said table support and table with reference to the rotary scraper.

2. A machine for making leather of uniform thickness including a rotary scraper, a table for holding the leather in position to be treated by the scraper, a table support adjustable toward and away from said scraper, means for elevating said table, and means for determining the distance between the scraper and the table and table support when the latter is elevated.

3. A machine for making leather of uniform thickness including a rotary scraper, a table for holding the leather in position to be treated by the scraper, a table support adjustable toward and away from said scraper, a shaft on said table supporting means, cams secured on the shaft for engaging and elevating the means for actuating said shaft, means for limiting the movement of the cams when the table is in its highest position, and means for predetermining the distance between the scraper and table and table support when the latter is elevated.

4. A machine for making leather of a uniform thickness including a rotary scraper, a table for holding the leather in position to be treated by the scraper, a table support adjustable toward and away from the rotary scraper, and to which said table is pivoted at one end thereof, means for elevating and lowering the other end of the table, and means for predetermining the position of said table support and table with reference to the rotary scraper.

5. A machine for making leather of a uniform thickness including a rotary scraper, a table for holding the leather in position to be treated by the scraper, a table support to which the table is pivoted at one end thereof, a cam for elevating the free end of said table, and means for limiting the movement of said cam when the table has reached its highest limit of movement.

6. A machine for making leather of uniform thickness including a rotary scraper, a table for holding the leather in position to be treated by the scraper, a table support adjustable toward and away from said scraper and to which said table is pivoted at one end thereof, means for elevating the other end of said table, and means for predetermining the distance between the scraper and the table when the latter is elevated.

7. A machine for making leather of uniform thickness including a rotary scraper, a table for holding the leather in position to be treated by the scraper, a table support adjustable toward and away from said scraper and to which said table is pivoted at one end thereof, a shaft on said table supporting means, cams secured on the shaft for engaging and elevating the free end of the table, pedal mechanism for actuating said shaft, means for limiting the movement of the cams when the table is in its highest position, and means for predetermining the distance between the scraper and table when the latter is elevated.

In witness whereof, I have hereunto affixed my signature.

HARRY A. BELL.

Copies of this patent may be obtained for five cents each, by addressing the "Commissioner of Patents Washington, D. C."